United States Patent
Gupta et al.

(10) Patent No.: US 9,593,667 B2
(45) Date of Patent: Mar. 14, 2017

(54) WIND TURBINE GENERATOR

(71) Applicant: VESTAS WIND SYSTEMS A/S, Aarhus N (DK)

(72) Inventors: Amit Kumar Gupta, Singapore (SG); Manoj Gupta, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/366,837

(22) PCT Filed: Dec. 20, 2012

(86) PCT No.: PCT/DK2012/050493
§ 371 (c)(1),
(2) Date: Jun. 19, 2014

(87) PCT Pub. No.: WO2013/097862
PCT Pub. Date: Jul. 4, 2013

(65) Prior Publication Data
US 2014/0339830 A1    Nov. 20, 2014

Related U.S. Application Data

(60) Provisional application No. 61/581,649, filed on Dec. 30, 2011.

(30) Foreign Application Priority Data

Dec. 29, 2011  (DK) .............................. 2011 70760

(51) Int. Cl.
*F03D 7/00*    (2006.01)
*F03D 9/00*    (2016.01)
(Continued)

(52) U.S. Cl.
CPC ............... *F03D 7/00* (2013.01); *F03D 9/003* (2013.01); *F03D 9/005* (2013.01); *H02J 3/386* (2013.01);
(Continued)

(58) Field of Classification Search
CPC ..... Y02E 10/723; Y02E 10/725; Y02E 10/72; Y02E 10/74; H02P 2009/004
(Continued)

(56) References Cited

U.S. PATENT DOCUMENTS 5,570,007 A * 10/1996 Larsen .................. H02J 3/1828
323/209
6,429,546 B1 * 8/2002 Ropp ........................ H02J 3/01
307/31

(Continued)

FOREIGN PATENT DOCUMENTS

AU    2009342166 A1 * 11/2010
DE    102004048341 A1    4/2006
(Continued)

OTHER PUBLICATIONS

International Search Report for PCT/DK2012/050493, Mar. 12, 2014.
Danish Search Report for PA 2011 70760, Jun. 18, 2012.

*Primary Examiner* — Tulsidas C Patel
*Assistant Examiner* — Charles Reid, Jr.
(74) *Attorney, Agent, or Firm* — Patterson + Sheridan, LLP (57) ABSTRACT

A wind turbine generator is disclosed herein. In a described embodiment, the wind turbine generator comprises an electrical generator 101 configured to generate AC signals, a plurality of power converters 110,112,111 operated by a gating signal with each power converter configured to convert the AC signals from the electrical generator 101 into
(Continued)

fixed frequency AC signals. The wind turbine generator further comprises a controller configured to enter a fault mode when a grid voltage falls outside an acceptable threshold, and during the fault mode the controller is configured to provide a reactive current reference dependant on a grid voltage distant from the wind turbine generator. A method of controlling a wind turbine generator is also disclosed.

16 Claims, 8 Drawing Sheets (51) Int. Cl.
    *H02J 3/38*     (2006.01)
    *H02M 5/458*     (2006.01)
    *H02P 101/15*     (2015.01)
(52) U.S. Cl.
    CPC ......... *H02M 5/458* (2013.01); *H02P 2101/15* (2015.01); *Y02E 10/763* (2013.01)
(58) Field of Classification Search
    USPC .................................................. 290/44, 55
    See application file for complete search history.

(56) References Cited

U.S. PATENT DOCUMENTS

| | | | | |
|---|---|---|---|---|
| 6,603,290 B2 * | 8/2003 | Hochgraf | ................. | H02J 3/38 307/32 |
| 7,408,268 B1 * | 8/2008 | Nocentini | ................. | H02J 3/38 307/16 |
| 7,509,190 B2 * | 3/2009 | Emery | ................. | G06Q 50/06 290/44 |
| 7,511,385 B2 * | 3/2009 | Jones | ................. | H02M 5/4585 290/43 |
| 8,787,052 B2 * | 7/2014 | O'Brien | ............... | H02J 3/383 323/207 |
| 2007/0100506 A1 * | 5/2007 | Teichmann | ............... | H02J 3/24 700/297 |
| 2007/0273155 A1 * | 11/2007 | Barton | ................. | H02J 3/1892 290/44 |
| 2009/0322082 A1 * | 12/2009 | Wagoner | ............... | H02M 5/458 290/44 |
| 2009/0322083 A1 * | 12/2009 | Wagoner | ................. | H02J 3/38 290/44 |
| 2010/0025995 A1 | 2/2010 | Lang et al. | | |
| 2010/0237834 A1 * | 9/2010 | Alonso Sadaba | ..... | F03D 7/0284 323/205 |
| 2010/0308585 A1 * | 12/2010 | Jorgensen | ............. | F03D 7/0284 290/44 |
| 2010/0314872 A1 * | 12/2010 | Wagoner | ............. | H02M 5/4585 290/44 |
| 2011/0057444 A1 | 3/2011 | Dai et al. | | |
| 2011/0133461 A1 | 6/2011 | Hjort | | |
| 2012/0161444 A1 * | 6/2012 | Tarnowski | ............ | F03D 7/0276 290/44 |

FOREIGN PATENT DOCUMENTS

| | | | | |
|---|---|---|---|---|
| EP | 2175540 A2 | 4/2010 | | |
| EP | 2236820 A2 | 10/2010 | | |
| GB | EP 1995863 A2 * | 11/2008 | ............... | H02J 3/01 |
| WO | 2007/006565 A2 | 1/2007 | | |
| WO | 2009/083445 A1 | 7/2009 | | |

* cited by examiner

WIND TURBINE GENERATOR

FIELD OF THE INVENTION

The present invention relates to a wind turbine generator (WTG) and/or a method.

BACKGROUND OF THE INVENTION

In each country there is a grid code which sets out the various standards that a power generator must meet to connect to the grid. The same applies to wind power. There are various requirements, one of which is to support the grid voltage during a grid fault. For example when the voltage at the point where the wind farm connects to the grid (point of common connection PCC) drops below 0.9 p.u. (90% of the nominal voltage) the wind turbines might be expected to inject a certain amount of reactive current.

For wind farms, this requirement is often met using capacitor banks and static synchronous compensators (STATCOMs), especially if the turbine is not a variable speed wind turbine. It has been seen that even for variable speed wind turbines certain amount of compensation equipment (STATCOMs and capacitor banks) are required. However, this compensation equipment is expensive and adds to the cost of Balance of Plant (BoP) equipment and which is required over and above the wind turbine generators (WTGs). Further, complex control strategy is required to meet the reactive power requirement at the PCC using the additional compensation.

In some cases the wind turbine controller may enter a fault mode when a low grid voltage condition occurs at the turbine terminals or in the grid. The fault mode may include injecting reactive current into the grid to support the grid voltage. However due to the significant impedances in the system external to the WTG, when the WTG starts injecting a reactive current the terminal voltage changes relative to voltages further along into the grid i.e. the actual voltage, and thus such a compensation from the turbine may not be accurate or reliable. Also there may be a problem where the WTG gets stuck in the fault mode leading to tripping of the WTG eventually. The same can be explained when the turbine is absorbing reactive power due to a high voltage event in the grid.

SUMMARY OF THE INVENTION

In general terms the invention proposes that the individual WTGs provide a better reactive current injection during a grid fault condition. This may have the advantage that (1) the grid support from a given wind farm is improved (2) the compensation requirement is lowered for each wind farm, thus reducing the installation cost and/or (3) it may also allow the WTG to reliably exit the fault mode once the voltage is improved.

In a first specific expression of the invention, there is provided a wind turbine generator comprising an electrical generator configured to generate AC signals, a plurality of power converters operated by a gating signal, each power converter configured to convert the AC signals from the electrical generator into fixed frequency AC signals, and a controller configured to enter a fault mode when a grid voltage falls outside an acceptable threshold, and during the fault mode the controller is configured to provide a reactive current reference dependent on a grid voltage distant from the wind turbine generator.

The grid voltage distant from the wind turbine generator may be estimated based on a relationship including a terminal voltage of the wind turbine generator. Preferably, the relationship also includes a terminal reactive current of the wind turbine generator and impedance external to the wind turbine generator. Further, the relationship may include impedance of a turbine transformer. Even further, the relationship may deduct/add a voltage drop across a WTG transformer and a voltage drop across an effective external impedance as seen by the wind turbine generator, from the terminal voltage of the wind turbine generator. Specifically, the effective external impedance may be an effective impedance of a wind farm.

Advantageously, the impedance of the wind farm may be determined based on the operational status of a plurality of transmission links with the wind farm or it may be determined at the predesign stage of the wind farm.

Preferably, the acceptable threshold relates to a predetermined WTG high voltage limit, low voltage limit, and/or voltage imbalance limit. The reactive current reference may also depends on one or more of: rated maximum reactive current rating, reactive current/voltage gain (K); Active power ripple, Reactive power ripple, Active power delivery, Reactive power delivery, Grid support requirements, Active power priority, Reactive power priority, Current Limit, Voltage limit, DC-link voltage ripple, DC-link voltage limit, Torque ripple, Converter voltage limit, Turbine supervision limits, Temperature of chopper resistors etc.

The wind turbine generator may further comprise a voltage transducer to measure the grid voltage distant from the wind turbine generator and a transmission link to convey a signal from the transducer to the controller.

In a second specific expression of the invention, there is provided a method of controlling a wind turbine generator comprising: determining whether to enter a fault mode, while in the fault mode, estimating a voltage at a location distant from the wind turbine generator, and providing a reactive current based on the estimated voltage.

Estimating the voltage may comprise measuring a terminal voltage of the wind turbine generator voltage and deducting or adding the voltage drop across impedances to the distant location. The voltage drop may be determined based on the reactive current and a determination of the impedance of a transformer and a transmission network between the wind turbine generator voltage and the distant location.

BRIEF DESCRIPTION OF THE DRAWINGS

In order that the invention may be fully understood and readily put into practical effect there shall now be described by way of non-limitative example only, an example embodiment described below with reference to the accompanying illustrative drawings in which.

DETAILED DESCRIPTION

A WTG generally includes a set of blades, a generator, transformer and a power converter. The turbine blades are rotated about a shaft by the wind and are mounted in a nacelle on a tower relatively high off the ground to ensure good airflow. The electrical generator is driven by the rotating shaft to produce typically alternating current (AC) voltage which varies in magnitude and frequency according to the wind speed. A gearbox may be used to step up the slow rotational speed of the shaft to a high rotational speed suitable for operating the generator. The generator may either be synchronous or asynchronous. The power converter converts and transfers power from the generator to the grid as described below.

Figure 1:
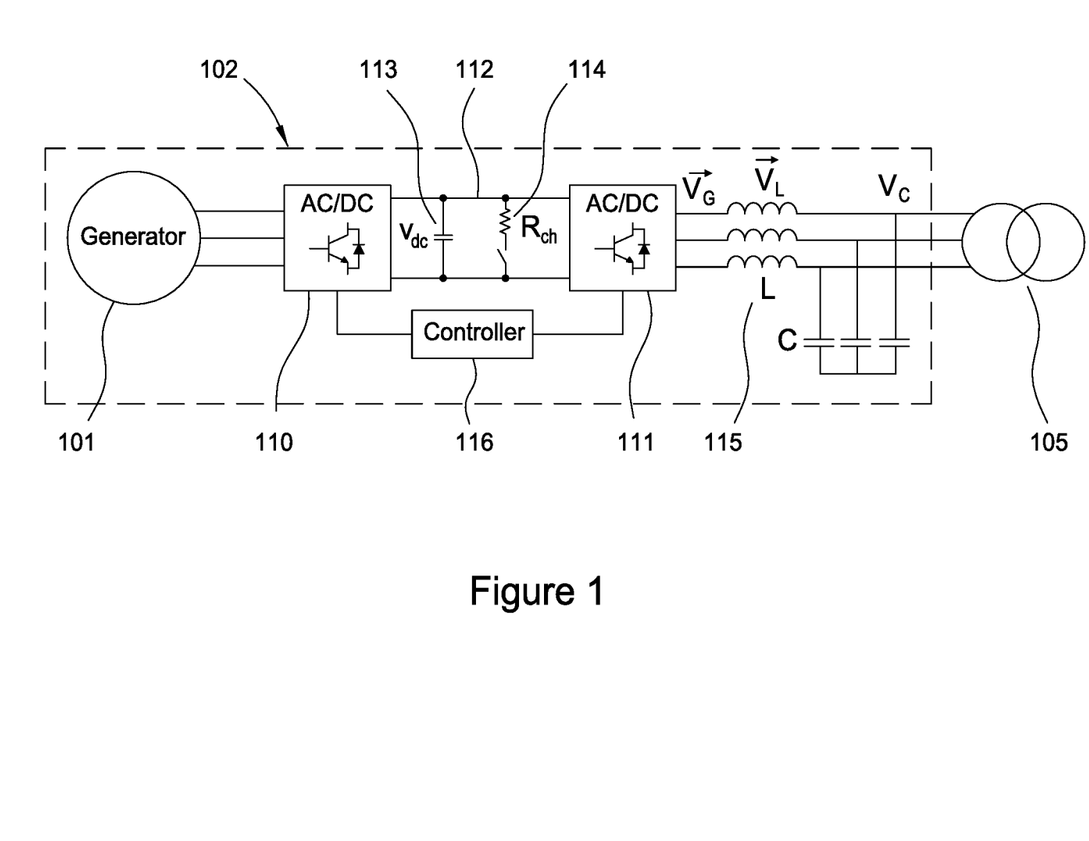
FIG. 1 is a schematic diagram of a full scale converter based WTG.

FIG. 1 shows an electrical system of the wind turbine according to an embodiment. The electrical system includes a generator 101, a power converter 102 and a main transformer 105.

The first power converter 102 includes a generator-side converter 110 and a grid-side converter 111 connected via a direct current (DC) link 112. The DC-link 112 includes a DC-link capacitor 113.

The generator 101 converts mechanical energy to electrical energy having AC (alternating current) voltage and current (collectively referred to as "AC signals"), and provides the generated AC signals to the generator-side converter 110. The AC signals from the generator have a variable frequency, due to varying wind. The generator-side converter 110 converts or rectifies the AC signals to a DC (direct current) voltage and a DC current (collectively know as "DC signals") towards the DC-link 112. A load dump 114 is provided to control the DC voltage on the DC-link 112 by absorbing any excess amount of active power provided by the generator 101 due to a grid fault or a similar event. The load dump comprises a power dissipation element and a switch in series, and connected across the DC-link of the converter. The grid-side converter 111 converts the DC signals from the DC-link 112 into fixed frequency AC signals for a power grid. The transformer 105 transforms the grid voltage to a suitable level on the low voltage side according to the drive train system hardware design. The power output of each grid-side converter 111 is fed to the power grid through main transformer 105. The transmissions lines may be connected directly to the grid or, if in a wind farm, join with other transmission lines at a point of common connection (PCC) before connecting to the grid. Filters 115 in the form of capacitors, inductors and resistors may be located between the common output point of each grid-side converter 111, and the power grid. Normally, a passive filter carries two branches: a main harmonic filter branch (capacitor banks) to absorb switching harmonics and a resonance branch (capacitors, small chokes and small resistors) to damp resonance phenomenon. The filter may also include other components such as contactors, fuses, sensors etc.

It should be noted that the electrical system described with reference to FIG. 1 is only an example of the electrical configuration of the wind turbine and only the main components are shown to illustrate the embodiments. The present invention should not be limited to the exact electrical system configuration shown in FIG. 1. Other electrical configurations are possible. For example while one power converter is shown, parallel converters may be provided depending on interleaving/redundancy requirements. Also, many components in the electrical system of the wind turbine may not be shown in FIG. 1. For example, the electrical system may include filters between the generator 101 and the power converters. Also, there may be switches arranged at various locations for connecting or disconnecting certain components of the turbine, and there may be transducers or transformers at various locations for measurement or metering. The converter may be placed on rotor circuit rather than being placed on stator circuit.

Under normal conditions a Power Plant Controller (PPC) monitors the AC signals at each WTG in the wind farm, the grid, the functional status of all WTGs and transmission links. According to a control strategy, the PPC issues an active power reference command Pref. and a reactive power reference command Qref for a given WTG to deliver a desired AC signal. Each WTG controller 116 comprises a generator-side converter controller, and a grid-side converter controller for controlling the generator-side converter 110 and the grid-side converter 111, respectively. These controllers could be on the same piece of controller hardware. The grid-side converter controller may also control a load dump switch of the load dump 114.

Figure 2:
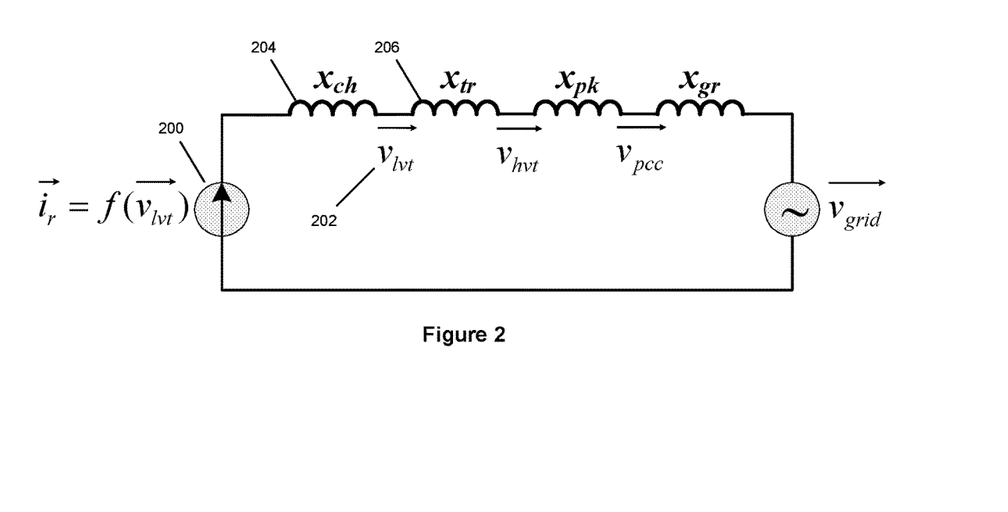
FIG. 2 is an equivalent circuit of the WTG in FIG. 1 according to an embodiment.

According to one embodiment shown in FIG. 2, during a low voltage grid fault condition, each WTG may switch to a fault mode. The fault mode may relate to a local fast control algorithm which operates independently of the PPC based on locally measured parameters at the WTG level. For example, the grid side converter may be operated so that the WTG appears as a voltage controlled reactive current source 200. The $i_r$ is dependent on the AC measured voltage $v_{lvt}$ 202 of the WTG, measured between the grid inductor or choke 204 and the transformer 206. This location is defined as the low voltage terminal of the WTG.

The same may be explained for a high voltage grid fault condition.

Figure 3:
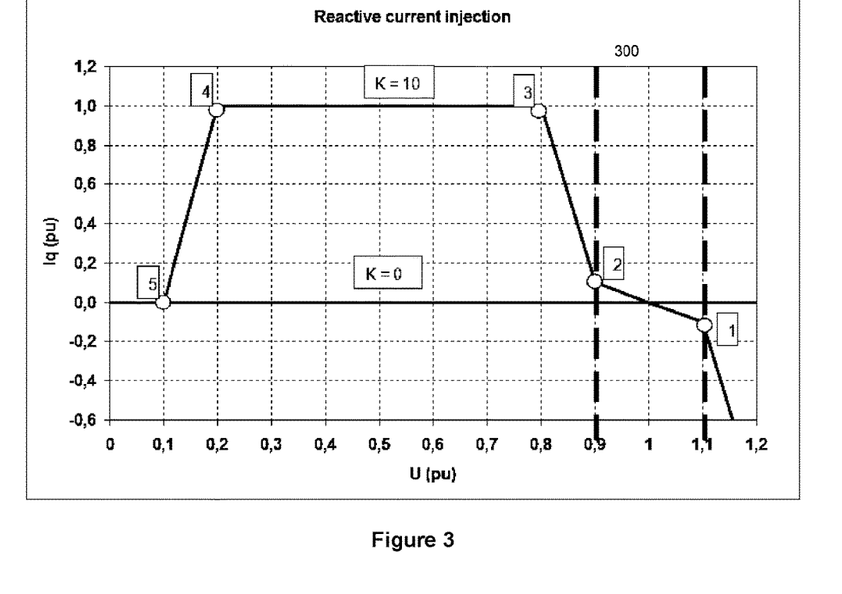
FIG. 3 is a graph of the reactive current to be injected versus Grid Voltage in FIG. 2.

The control characteristic between the voltage and the current is shown in FIG. 3. When the voltage exceeds 0.9 p.u., the WTG controller will exit 300 the fault mode and the PPC will take over control of the WTG. The numbers shown in FIG. 3 are exemplary and may change at various location/country/site.

When in the grid fault mode, the $i_r$ is generally delivered as per FIG. 3. However when the voltage approaches 0.9 p.u. the current is scaled 302 back towards a zero value which is effected when the voltage approaches 0.9 p.u. The reactive current/voltage gain (K) in this case is 2, although this may depend on whether the WTG is connected to a strong or weak grid system.

Using the plot in FIG. 3 on the WTG of FIG. 2, voltages which are distant to the low voltage terminal of the WTG, i.e. further along the circuit towards the PCC, will be lower due to the voltage drop across the various impedances as compared to the WTG terminal voltage. In FIG. 3 since K=2, when the $v_{lvt}$ is above 0.4 p.u. the WTG will be delivering an $i_r$ of less than 1 p.u. Even at the PCC, due to the significant voltage drop across the wind farm transformers and other impedances in between, the voltage will be lower than what it could potentially be if the WTG were delivering a higher $i_r$, which it is capable of doing. This can be understood from FIG. 2 i.e. since the current injection is dependent on the turbine LV voltage, the turbine terminal voltage changes with the amount of injected reactive current. This is dependent of the impedance seen. This leads to reduced injection from the turbine. Also, when the grid voltage is close to 0.9 p.u. the turbine sometimes remains in grid fault mode for a significantly longer time and eventually trips. The seemingly obvious solution would be to increase K, but since wind farms may also be connected to a weak grid system, this would lead to voltage instability. Another solution would be to dynamically set K, but this would need real time interaction with the power plant controller and it would require significant coordination efforts which requires sufficient communications speed.

Figure 7:
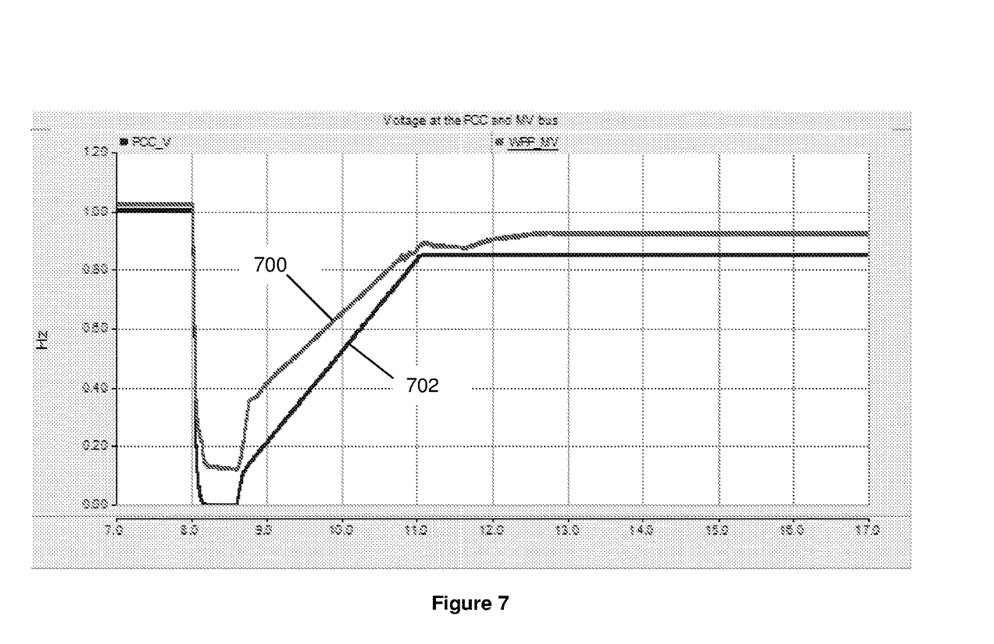
FIGS. 7 to 9 are graphs of simulation results for the WTG.
Figure 8:
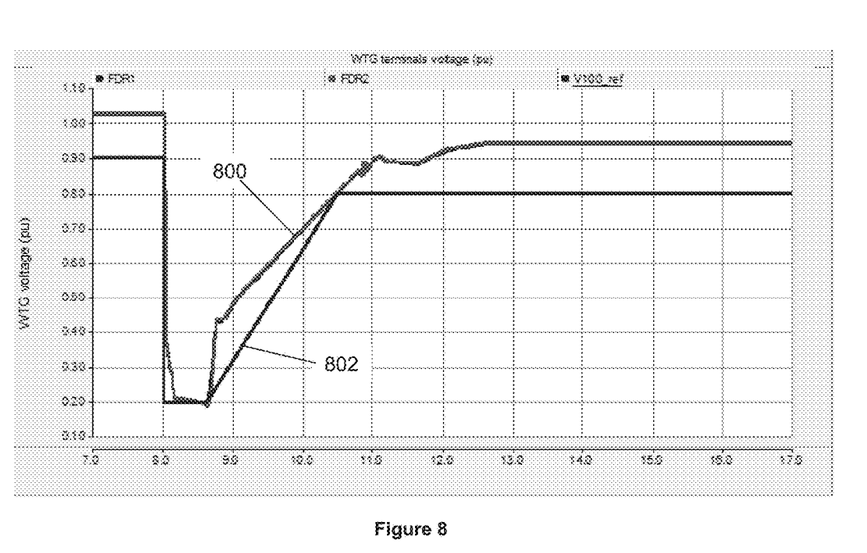
Figure 9:
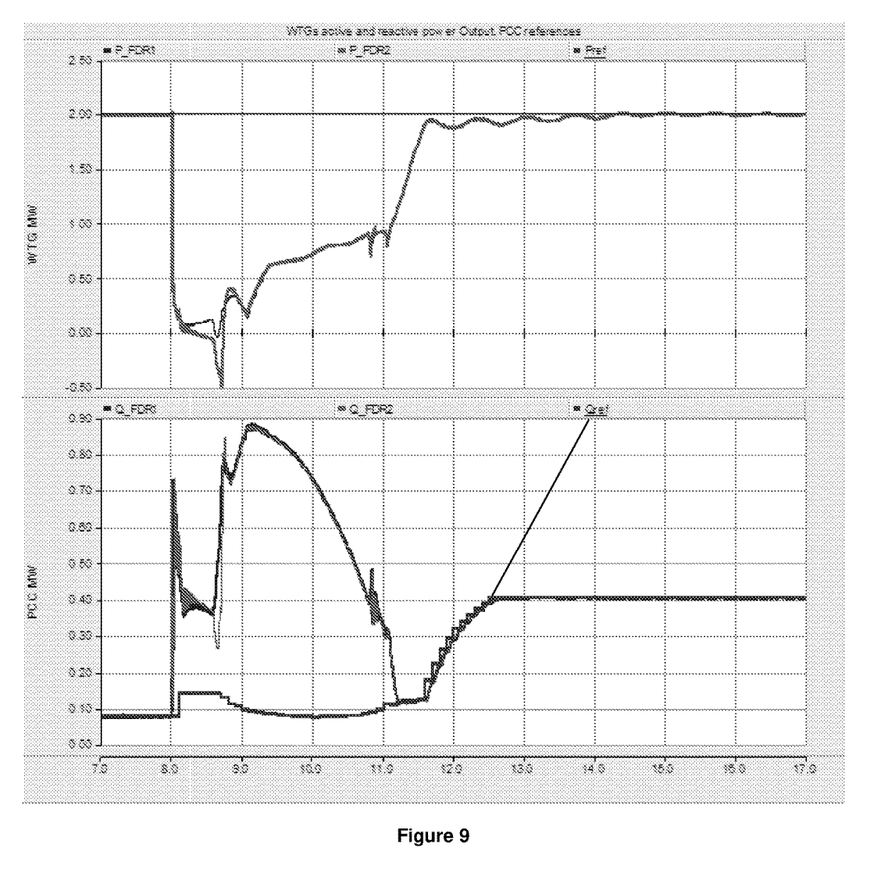

FIGS. 7 to 9 show simulation results for a DFIG type WTG but both DFIG and Full Scale Converter based WTG behave like a current source during the fault mode in a grid low voltage event. This may be similar to what might be expected for the WTG in FIG. 2. In FIG. 7, when the voltage at the PCC is reduced (as shown by plot 702 of FIG. 7 which is voltage at the PCC and plot 700 corresponds to WTG terminals voltage), the voltage at the WTG terminal is also reduced. FIG. 8 illustrates a plot of the reduced WTG terminal voltage 800 (as shown in FIG. 7), voltage at the PCC and a reference threshold voltage 802. In this particular case, as per the requirements, when the voltage at the WTG terminal is lower than 0.85 p.u., the Fault Mode is turned ON, and the WTG injects reactive power and reduces the active power. However if the WTG terminal voltage remains below 0.9 p.u., it remains in the fault mode. It is worth noting that the voltage at the PCC is below 0.85 p.u. when the voltage at the WTG terminal crosses 0.85 p.u.

The above effect is illustrated in FIG. 9. With reduction in the WTG terminal voltage, the WTGs slips into the LVRT mode where the active power is reduced and the reactive power is increased. The maximum reactive current is available when the voltage at the WTG terminals is between 0.2 p.u. to 0.5 p.u as per an embodiment. After that, it starts reducing and follows a slope curve of 50% for the reactive current injection against the WTG terminals voltage. During the LVRT mode, $Q_{reference}$ ($Q_{ref}$) from the PPC is not followed and WTGs are generating the reactive power depending on the WTG terminal voltage. When the WTG terminal voltage exceeds 0.85 p.u., the WTG is out of the LVRT mode and starts following the $Q_{reference}$ from the PPC, and active power is ramped up to the requested power.

Figure 4:
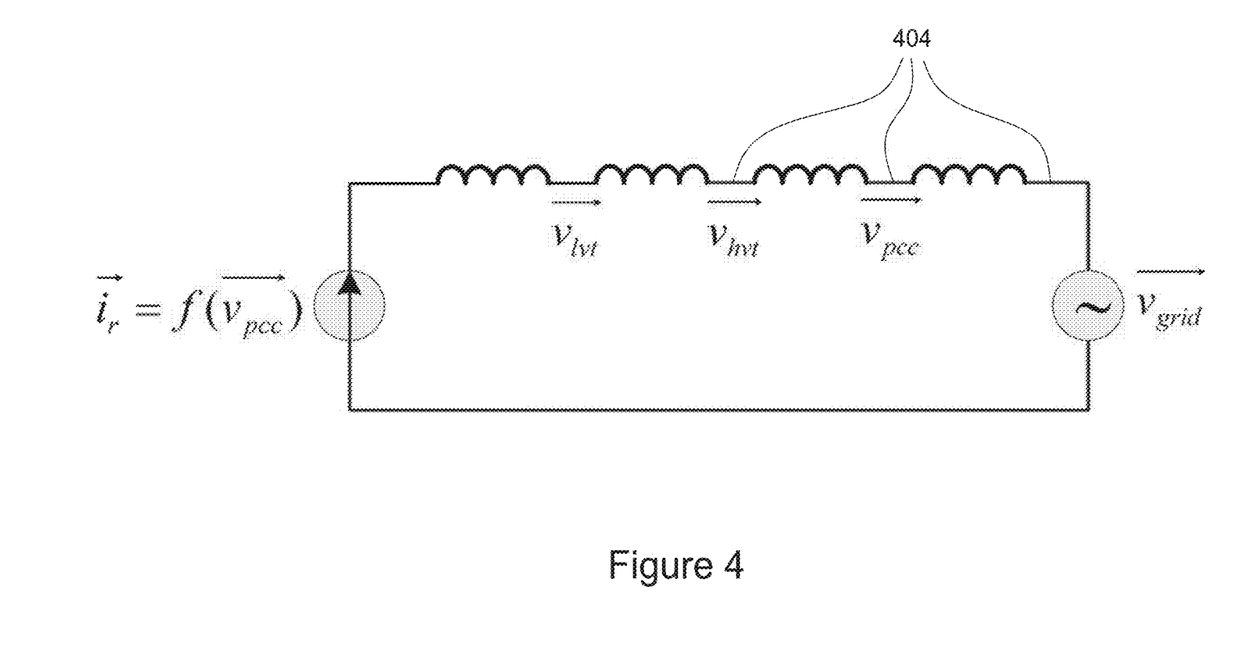
FIG. 4 is an equivalent simplified circuit of the WTG in FIG. 1 according to another embodiment.
Figure 10:
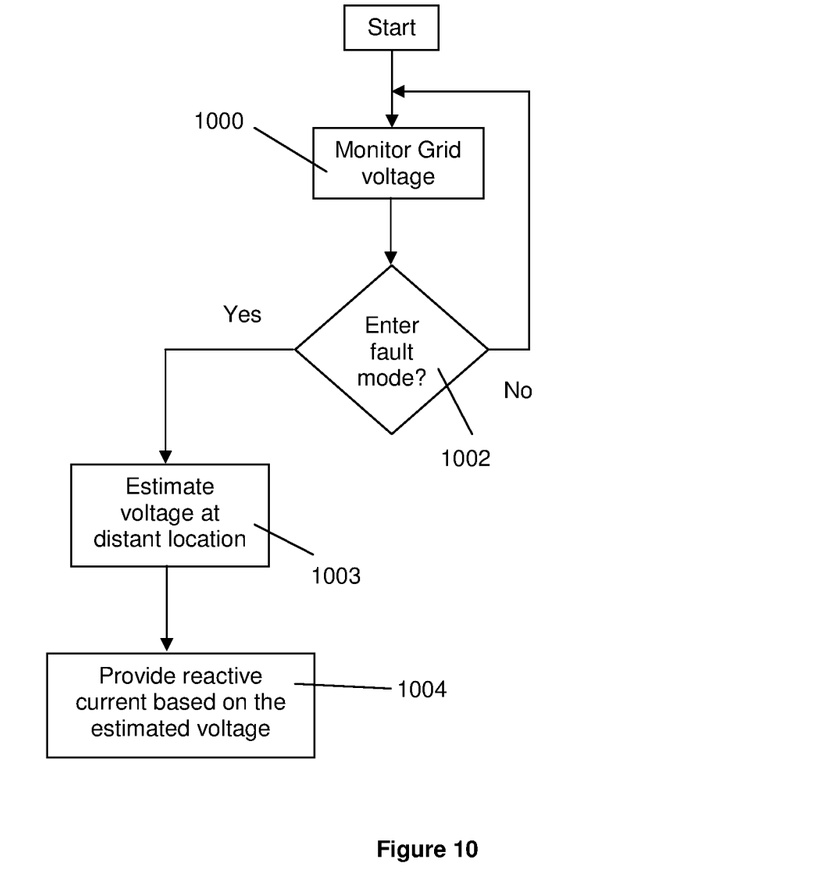
FIG. 10 is a flowchart illustrating operation steps implemented by the embodiment of FIG. 4.

An alternative is shown in FIG. 4 according to another embodiment and FIG. 10 illustrates the steps for providing reactive current. Similar to the other embodiment, a PPC monitors the AC signals at step 1000 at each WTG in the wind farm, the grid, the functional status of all WTGs and transmission links 404. Also, if a low voltage grid fault condition is detected, each WTG switches to a fault mode as illustrated at step 1002. However, in this case, the i, current source 400 is dependent on an AC voltage 402 distant from the WTG terminals as illustrated in FIG. 4. For example it may depend on the voltage at the PCC vpcc rather than vM. Since the distant voltage is much less affected by the current injection and the impedances, this voltage will be more stable and suitable for current injection. This may have the advantage that more reactive current is supplied by each WTG under low voltage conditions, and thus more accurate/reliable injection may be expected in the grid during the fault. The same can be explained for the high voltage grid fault event.

Figure 5:
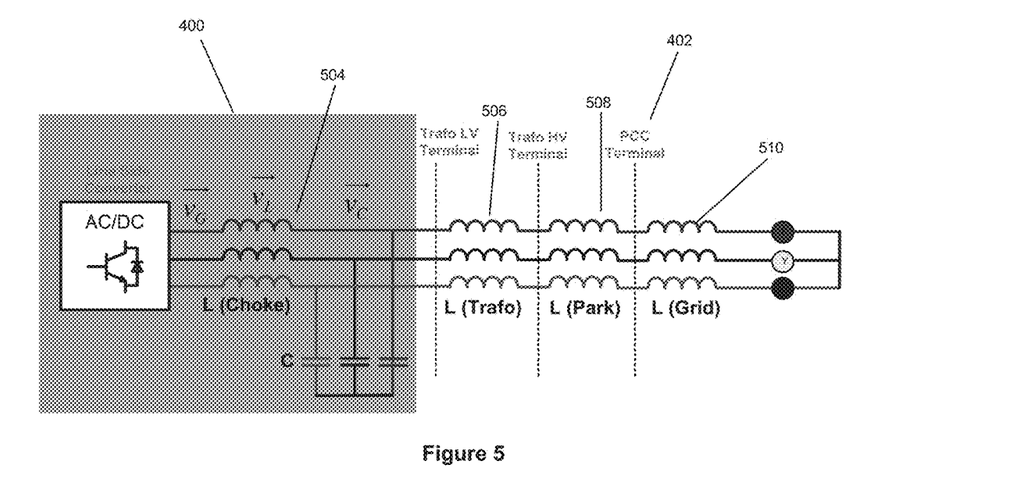
FIG. 5: is a simplified circuit of the WTG in FIG. 4.

In order to determine $v_{pcc}$, it may be possible to measure it directly, although in view of the requirement for fast response, it may be more desirable to estimate it based on the WTG terminal voltage, and this is illustrated as step 1003 of FIG. 10. A simplified circuit of the WTG of FIG. 4 is shown in FIG. 5. As seen by the grid side converter, the main voltage affecting components are the turbine choke inductance 504, the turbine transformer inductance 506 (or more generally, the turbine transformer impedance), the combined inductance of the wind farm transmission network 508 including the grid transformer, and the grid inductance 510. Thus, the voltage drop across the turbine transformer inductance 506 and the combined inductance of the wind farm transmission network 508 can be obtained or deducted from the turbine terminal voltage to estimate the $v_{pcc}$. The positive and negative sequence PCC voltage can be determined per equations 1 and 2:

$$\vec{v}_{pcc}{}^+ = \vec{v}_{lvt}{}^{30} - (x_{tr}+x_{pk})*\vec{i}_r{}^+ \quad (1)$$

$$\vec{v}_{pcc}{}^- = \vec{v}_{lvt}{}^{31} + (x_{tr}+x_{pk})*\vec{i}_r{}^- \quad (2)$$

where $\vec{v}_{pcc}{}^+$ Approximate/estimated positive sequence voltage at the PCC $\vec{v}_{pcc}{}^-$ Approximate/estimated negative sequence voltage at the PCC $\vec{v}_{lvt}{}^+$ Actual positive sequence voltage at the low voltage (LV) side of the WTG $\vec{v}_{lvt}{}^-$ Actual negative sequence voltage at the low voltage (LV) side of the WTG $i_r{}^+$ Positive sequence reactive current injected/absorbed by WTG $i_r{}^-$ Negative sequence reactive current injected/absorbed by WTG $x_{tr}$ Reactance offered by the nacelle transformer $x_{pk}$ Reactance offered by the wind farm. This can be determined in real-time by PPC according to status of the transmission links. This is the equivalent value for one turbine. This could also be determined during the electrical predesign stage of the wind farm.

The voltage determined from these expressions may not be the actual voltage at PCC but a voltage closer to actual PCC voltage. The use of this voltage may lead to better injection from the turbine as compared to using simply the voltage at the turbine low voltage terminal. Thus, it may be desirable to estimate a voltage from a location distant from the WTG and provide a reactive current based on the estimated voltage as illustrated at step 1004 of FIG. 10, but the precise actual location of that particular voltage in the line profile, may not be known or determined precisely. For the expressions above, the resistive drop is neglected. However if resistive component is significant then resistive drop may be taken into consideration.

Thus $x_{tr}$, $x_{pk}$ and other impedances are stored by the WTG controller. $x_{pk}$ may be periodically updated by the PPC but it normally does not change very often. Referring to equation 1, an initial estimate of $i_r{}^+$ should be determined in advance based off the measured $v_{pcc}$ with using the voltage control characteristic in FIG. 6.

On the same lines, the initial value of the negative sequence PCC voltage can be estimated leading to an initial estimate for $i_r{}^-$. In a symmetrical grid fault condition, the positive sequence reactive current could be determined based on FIG. 3 or 6 and the negative sequence reactive current is substantially zero. But under an asymmetrical fault condition, the final value for the positive and negative sequence reactive current are also dependent on at least one of the following; Active power ripple, Reactive power ripple, Active power delivery, Reactive power delivery, Grid support requirement, Active power priority, Reactive power priority, Current Limit, Voltage limit, DC-link voltage ripple, DC-link voltage limit, Torque ripple, Converter voltage limit, Turbine supervision limits, Temperature of chopper resistors etc.

In simpler implementations it may be possible to estimate for a particular installation a correction factor to apply $v_{lvt}$ to estimate $v_{pcc}$.

In FIG. 3, the K=2 but its value can be higher or lower. For example for K=10 the FIG. 3 is modified to FIG. 6.

Figure 6:
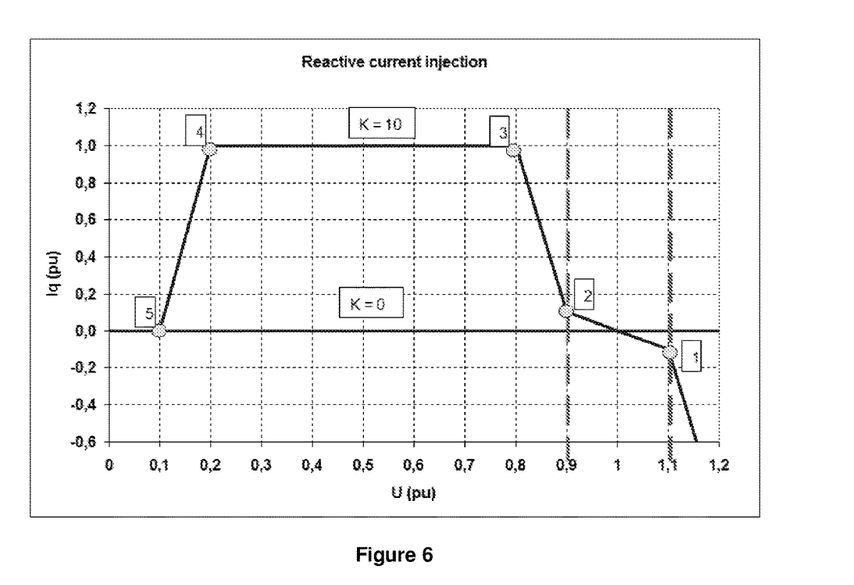
FIG. 6 is a graph of the reactive current to be injected versus the Grid Voltage in FIG. 4.

The control characteristic in FIG. 6 is also modified by providing a small positive sequence current $i_r^+$ when $v_{pcc}$=0.9 p.u. to force the WTG controller out of fault mode. If the $i_r^+$ is too low when $v_{pcc}$ approaches 0.9 p.u. it may never get past the threshold and thus never break out of fault mode. Under some grid codes the WTG would be expected to trip after 60 seconds in fault mode, which is undesirable in such cases as it may lead to wider instability.

Also the peak available $i_r^+$ may not be 1 p.u. With certain faults, particularly unbalanced faults, the grid side converter may not be capable of delivering as much reactive current. The WTG controller will be able to determine in real-time the maximum possible $i_r^+$ which may depend on the relative level of negative and/or zero sequence voltage.

As well as low voltage, if the voltage rises above 1.1 p.u. the WTG can react as shown in FIGS. 3 & 6 by absorbing reactive current. When a voltage imbalance occurs, the current injection or absorption can be implemented on each phase independently. Thus the present invention can be useful in those cases as well to ensure that the estimated distant voltage e.g. $v_{pcc}$ is more effectively used by the WTG control for fault handling.

While embodiments of the invention have been described in detail, many variations are possible within the scope of the invention as claimed as will be clear to a skilled reader. For example while a full scale turbine was described, the invention may also be applied to Doubly Fed Induction Generator (DFIG) type WTG.

One or more embodiments may have the advantage that:
Less dynamic compensation may be required;
Very fast reaction time to grid voltage conditions; and/or
Can be implemented in existing hardware with simple software update.

What is claimed is:

1. A wind turbine generator comprising:
an electrical generator configured to generate AC signals,
a plurality of converters operated by a gating signal, the converters are configured to convert the AC signals from the electrical generator into fixed frequency AC signals,
a transformer having an input coupled to the generator, and
a controller configured to enter a fault mode when a grid voltage falls outside an acceptable threshold, and during the fault mode the controller is configured to provide a reactive current reference dependent on an estimated grid voltage at a point on a transmission link coupled to an output of the transformer, wherein the grid voltage is estimated based on an impedance between the point and the wind turbine generator and wherein a first terminal of the transmission link is coupled to the output of the transformer, and a second terminal of the transmission link is coupled to a point of common coupling.

2. The wind turbine generator in claim 1, wherein the estimated grid voltage is estimated based on a relationship including a terminal voltage of the wind turbine generator.

3. The wind turbine generator in claim 2, wherein the relationship also includes a terminal reactive current of the wind turbine generator.

4. The wind turbine generator of claim 3, wherein the relationship further includes an impedance of the transformer.

5. The wind turbine generator in claim 3, wherein the relationship is deducting or adding a voltage drop across the transformer and a voltage drop across an effective impedance of a wind farm as seen by the wind turbine generator from the terminal voltage of the wind turbine generator.

6. The wind turbine generator in claim 5, wherein the effective impedance of the wind farm is determined based on the operational status of a plurality of transmission links with the wind farm or the effective impedance of the wind farm is determined at a predesign stage of the wind farm.

7. The wind turbine generator in claim 1, wherein the acceptable threshold relates to a predetermined wind turbine generator limit comprising at least one of: high voltage limit, low voltage limit, positive sequence voltage limit, negative sequence voltage limit, and voltage imbalance limit.

8. The wind turbine generator in claim 1, wherein the reactive current reference also depends on one or more of: a rated maximum reactive current rating, reactive current/voltage gain (K), active power ripple, reactive power ripple, active power delivery, reactive power delivery, grid support requirement, active power priority, reactive power priority, current limit, voltage limit, DC-link voltage ripple, DC-link voltage limit, torque ripple, converter voltage limit, turbine supervision limits, and temperature of chopper resistors.

9. The wind turbine generator in claim 1, further comprising a voltage transducer to measure the grid voltage at the point on the transmission link.

10. A method of controlling a wind turbine generator comprising:
determining whether to enter a fault mode,
while in the fault mode, estimating a grid voltage at a point on a transmission link coupled to an output of a transformer of the wind turbine generator, wherein the grid voltage is estimated based on an impedance between the point and the wind turbine generator, and providing a reactive current based on the estimated voltage and wherein a first terminal of the transmission link is coupled to the output of the transformer, and a second terminal of the transmission link is coupled to a point of common coupling.

11. The method in claim 10, wherein estimating the grid voltage comprises measuring a terminal voltage of the wind turbine generator voltage and deducting or adding a voltage drop across impedances to the point.

12. The method in claim 11, wherein the voltage drop is determined based on the reactive current and a determination of the impedance of the transformer and an effective impedance of a wind farm as seen by the wind turbine generator from the terminal voltage of the wind turbine generator.

13. The method in claim 10, wherein determining whether to enter a fault mode is based on a predetermined wind turbine generator limit comprising at least one of: high voltage limit, low voltage limit, positive sequence voltage limit, negative sequence voltage limit, and voltage imbalance limit.

14. The method in claim 10, wherein the reactive current is based on at least one of: a rated maximum reactive current rating, reactive current/voltage gain (K), active power ripple, reactive power ripple, active power delivery, reactive power delivery, grid support requirement, active power priority, reactive power priority, current limit, voltage limit, DC-link voltage ripple, DC-link voltage limit, torque ripple, converter voltage limit, turbine supervision limits, and temperature of chopper resistors.

15. The wind turbine generator of claim 1, wherein the fault mode further comprises operating the wind turbine generator independently of a power plant controller based on locally measured parameters at the wind turbine generator.

16. The method in claim 10, wherein the fault mode further comprises operating the wind turbine generator independently of a power plant controller based on locally measured parameters at the wind turbine generator.

* * * * *